US009702738B2

(12) United States Patent
Schade

(10) Patent No.: US 9,702,738 B2
(45) Date of Patent: Jul. 11, 2017

(54) APPARATUS FOR MEASURING MECHANICAL MEASURANDS WITH OPTICAL SENSOR

(75) Inventor: Wolfgang Schade, Goslar (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 51 days.

(21) Appl. No.: 14/114,085

(22) PCT Filed: Apr. 26, 2012

(86) PCT No.: PCT/EP2012/057610
§ 371 (c)(1),
(2), (4) Date: Oct. 25, 2013

(87) PCT Pub. No.: WO2012/146640
PCT Pub. Date: Nov. 1, 2012

(65) Prior Publication Data
US 2014/0061452 A1   Mar. 6, 2014

(30) Foreign Application Priority Data

Apr. 27, 2011 (DE) .................. 10 2011 017 622

(51) Int. Cl.
*G02B 6/00* (2006.01)
*G01D 5/353* (2006.01)
*G01M 11/08* (2006.01)
*G02B 6/02* (2006.01)
*G02B 6/12* (2006.01)
(Continued)

(52) U.S. Cl.
CPC ....... *G01D 5/3537* (2013.01); *G01D 5/35316* (2013.01); *G01D 5/35383* (2013.01);
(Continued)

(58) Field of Classification Search
CPC ... G02B 6/00; G02B 6/26; G02B 6/34; G02B 6/36; G02B 6/02085; G02B 6/02128;
(Continued)

(56) References Cited

U.S. PATENT DOCUMENTS 6,204,920 B1 *   3/2001   Ellerbrock ......... G01D 5/35383
                                                          250/227.13
6,448,551 B1 *   9/2002   Kersey ............... G01D 5/35316
                                                          250/227.14
(Continued)

FOREIGN PATENT DOCUMENTS

DE   10 2009 014 478 A1   9/2010
DE   10 2010 001 197 A1   7/2011

OTHER PUBLICATIONS

International Search Report and Written Opinion for PCT Application No. PCT/EP2012/057610 dated Apr. 2, 2012.
(Continued)

*Primary Examiner* — Kevin Pyo
(74) *Attorney, Agent, or Firm* — Brinks Gilson & Lione

(57) ABSTRACT

An apparatus for measuring state variables with at least one fiber-optic sensor, containing at least one optical coupler, at least one filter element and at least one photoelectric converter, where the optical coupler, the filter element and the photoelectric converter are integrated on a substrate, and the filter element contains at least one Bragg grating which is designed to supply the light portion reflected by the Bragg grating to the photoelectric converter.

28 Claims, 4 Drawing Sheets

(52) U.S. Cl.
CPC ....... *G01D 5/35387* (2013.01); *G01M 11/083* (2013.01); *G02B 6/02195* (2013.01); *G02B 6/12004* (2013.01)

(58) Field of Classification Search
CPC ............ G02B 6/12007; G02B 6/29317; G02B 6/29319; G02B 6/305; G02B 6/4246; G01D 5/353; G01D 5/35383
USPC ...... 385/10, 12–16, 24, 37, 88, 92; 250/216, 250/221, 227.11; 264/1.37
See application file for complete search history.

(56) References Cited

U.S. PATENT DOCUMENTS

| | | | |
|---|---|---|---|
| 6,573,026 B1* | 6/2003 | Aitken | ................ C03C 23/0025 385/123 |
| 6,647,160 B1 | 11/2003 | Chi et al. | |
| 7,512,291 B2 | 3/2009 | Mendoza | |
| 7,541,573 B2* | 6/2009 | Emmerson | ......... G01N 21/4133 250/227.18 |
| 2003/0016721 A1* | 1/2003 | Naganuma | .......... H01S 3/06754 372/97 |
| 2007/0280605 A1* | 12/2007 | Mendoza | ........................ 385/92 |
| 2008/0138088 A1 | 6/2008 | Welch et al. | |
| 2009/0304331 A1 | 12/2009 | Herman et al. | |
| 2012/0321242 A1 | 12/2012 | Schade et al. | |

OTHER PUBLICATIONS

Jackson D. A. et al.: "Simple Multiplexing Scheme for a Fiber-Optic Grating Sensor Network", Optics Letters, OSA, Optical Society of America, Washington, DC. dated Jan. 15, 1993, pp. 1192-1194.

* cited by examiner ical component. The
APPARATUS FOR MEASURING MECHANICAL MEASURANDS WITH OPTICAL SENSOR

BACKGROUND

The invention relates to an apparatus for measuring state variables with at least one fiber-optic sensor, containing at least one optical coupler, at least one filter element and at least one photoelectric converter. The invention also relates to a method for producing such an apparatus and the use thereof.

EP 1 826 545 A2 discloses an apparatus of the above mentioned type. The apparatus uses an optical waveguide which is laid in or along a mechanical component. The optical waveguide has a plurality of fiber Bragg gratings. Each fiber Bragg grating reflects part of an optical input signal running in the optical waveguide. Upon the influence of a mechanical stress, the length of the optical waveguide and thus the grating constant of the fiber Bragg grating will change. As a result, the reflected wavelength changes as well, and therefore it is possible to extrapolate to the stress and/or the temperature of the mechanical component from an evaluation of the reflected optical output signal.

In order to generate and evaluate the optical signal, it is known to use a wide band light source, an optical circulator and an arrayed waveguide grating. These components are joined as discrete devices with known optic connectors or splices. However, this approach has the drawback that the apparatus for generating and evaluating signals shows little mechanical robustness. Furthermore, the space required and the energy consumed are comparatively great, and therefore this known apparatus can only be produced and operated with considerable expenditure.

Based on this known apparatus, the object of the invention is thus to provide an apparatus for measuring state variables, which makes do with a small space available and can be produced and used in simple and cost-effective way.

SUMMARY

According to the invention it is proposed to determine forces applied, mechanical stresses and/or temperatures at mechanical components by changing the grating constants of at least one fiber Bragg grating which is formed in an optical waveguide. The mechanical component can here be a component made of a fiber-reinforced plastic material in some embodiments of the invention. In other embodiments of the invention, the mechanical component can consist of a metal or an alloy. The mechanical component can be an aircraft part, a wind turbine part, a car body part or a vehicle drive component, for example. In some embodiments of the invention, the mechanical component can be made of a textile fabric or contain such a fabric. In this case, the mechanical component can be a textile floor covering or a canvas.

A fiber-optic sensor laid in or along the component can be compressed or stretched by forces which are applied to the mechanical component. This change in length changes the grating constant of at least one fiber Bragg grating which is formed in the optical waveguide of the fiber-optic sensor. In some embodiments of the invention, the optical waveguide and/or the optical fiber can contain a plurality of fiber Bragg gratings which can have different grating constants.

The fiber-optic sensor is readout in generally known manner by an optical signal which is produced by at least one light source. In some embodiments of the invention, the light source can emit a wide band optical signal, and therefore a plurality of fiber Bragg gratings can be readout with different grating constant.

The optical input signal portion reflected by the at least one fiber Bragg grating is filtered by at least one passive optical component and converted into an electrical signal by a photoelectric converter. The electrical signal can then be supplied to an evaluation circuit.

According to the invention, it is now proposed to integrate at least one optical coupler, at least one filter element and at least one photoelectric converter on a substrate. In this way, the apparatus for measuring state variables can be at least partially made as an integrated optical component. This serves for reducing the space required and/or increasing the reliability of the apparatus and/or lowering the power consumed. In some embodiments of the invention, a semiconductor material and/or an optically transparent material are suitable as the substrate.

The at least one coupler can be used for connecting a single light source to a plurality of optical fibers and/or alternately connecting an optical fiber to the light source and the filter element and/or connecting a filter element to a photoelectric converter.

In some embodiments of the invention, the substrate contains quartz and/or silicon and/or sapphire and/or glass and/or gallium arsenide. These substrates allow a simple integration of the optical components and/or the simultaneous integration of electrical and electronic components on the substrate.

In some embodiments of the invention, an electronic circuit can also be integrated on the substrate. Such a circuit can process the electrical signals of the at least one photoelectric converter as an evaluation circuit.

To this end, the electronic circuit can realize at least one amplifier and/or A/D converter and/or memory and/or analog or digital, wireless or wire-bound interface. In other embodiments of the invention, the electronic circuit can additionally provide a supply voltage. For this purpose, the electronic circuit can contain a voltage transformer and/or a rectifier and/or a photoelectric or thermoelectric cell. Finally, the electronic circuit can be used for generating an optical input signal and for providing functions for generating a supply voltage of a light source and/or functions for regulating or controlling the liquid source. Such an integration of an electronic circuit on the substrate further miniaturizes the apparatus and further increases the reliability when state variables on mechanical components are determined.

In some embodiments of the invention, the at least one electronic circuit can be realized as a CMOS circuit. Such a CMOS circuit can be realized on a silicon substrate using conventional, widely spread manufacturing methods of microelectronics, and therefore the proposed apparatus can be produced in simple way on known assembly lines.

In some embodiments of the invention, the apparatus also contains at least one light source which is integrated on the substrate. The apparatus can thus be fully integrated on a substrate so as to yield a compact design on a single chip which can be produced in cost-effective manner and can be operated reliably and with very little energy consumption. As a result, extremely compact apparatuses can be produced which, in some embodiments, only require one power connection and one data connection and can be integrated into the mechanical component together with the fiber-optic sensor. It is thus possible to realize components which monitor themselves and provide a user and the maintenance staff with references to the load occurred or occurring and/or a wear limit by inquiries of the data line.

In some embodiments of the invention, the light source can produce an optical input signal having wavelengths between 750 nm and 1600 nm, 850 nm and 1500 nm or 1250 nm and 1450 nm. Thus, optical waveguides and/or optical fibers from the telecommunication technology, which are readily available, can be used in some embodiments.

In some embodiments of the invention, the light source can be a superluminescent diode and/or a semiconductor laser. A superluminescent diode distinguishes itself by a wide band optical spectrum, and therefore a plurality of fiber-optic sensors can be readout. A semiconductor laser can generate a brilliant radiation which can be coupled into a fiber-optic sensor with only minor introduction losses.

In some embodiments, the filter element can be a passive optical component which assigns at least one single fiber Bragg grating having a presettable grating constant or at least one group of fiber Bragg gratings having a presettable grating constant to a particular photoelectric converter. To this end, the filter element can reflect or transmit light of a presettable wavelength or a presettable wavelength range, and therefore only this wavelength range impinges on the photoelectric converter. Thus, certain fiber Bragg gratings can be readout by certain photoelectric converters, and therefore the measurement signals can be clearly assigned to a specific point on the mechanical component.

In some embodiments of the invention, the filter element can contain at least one arrayed waveguide grating. The arrayed waveguide grating is a dispersive element which pictures a wavelength difference of an optical input signal in a location difference at the output of the arrayed waveguide grating. If a spatially resolving, photoelectric converter or a plurality of different photoelectric converters is provided at different locations at the output, signals of different wavelength can be readout independently of one another and thus can be assigned to certain fiber Bragg gratings and/or certain measuring points. An arrayed waveguide grating can be produced on a substrate as an integrated optical component by structuring and etching. In other embodiments of the invention, an arrayed waveguide grating can be written into the substrate by means of material modification using laser radiation.

In some embodiments of the invention, the filter element contains at least one Bragg grating. Such a Bragg grating can reflect light of a presettable wavelength and can transmit light of a differing wavelength, and therefore only light having a presettable wavelength reaches the photoelectric transducer. Thus, the electrical signal of a presettable photoelectric transducer can be assigned to certain fiber Bragg gratings and/or certain measuring points.

In some embodiments of the invention, a Bragg grating having spatially variable grating constants can be used as the filter element. Such a Bragg grating reflects a greater wavelength range, and therefore light which has a shifted wavelength on account of a change in a mechanical state variable can travel from the filter element to the associated photoelectric converter.

In some embodiments of the invention, it can additionally contain at least one multiplexer 510 having at least two inputs 512 and at least one output 514, wherein the output 514 is connected to the at least one filter element 530 and the inputs 512 can be connected to one optical waveguide 220 each. As a result of this feature, a plurality of fiber Bragg gratings of equal grating constant can be readout sequentially in different optical waveguides 220. As a result, the number of channels provided by the filter element 530 and/or the number of photoelectric converters can be reduced without reducing the number of readable measuring points or fiber Bragg gratings. The apparatus according to the invention can thus be produced more easily and can be operated reliably. In some embodiments of the invention, the number of channels provided by the filter element 530 can be between 8 and 32.

In some embodiments of the invention, the photoelectric converter can contain at least one photodiode and/or at least one CCD line. A photodiode can be made as a pin diode. This embodiment enables a rapid signal readout, and therefore it is also possible to detect temporally variable operating conditions, such as vibrations. In other embodiments of the invention, it is possible to extrapolate from the vibration analysis of the mechanical component and/or the change in the natural frequencies to the wear thereof. However, a CCD line permits the simple selection of a plurality of channels, and therefore a plurality of fiber Bragg gratings can be readout and a good spatial resolution can be achieved in the measurement of state variables.

In some embodiments of the invention, the apparatus also contains at least one waveguide for transmitting optical signals and/or at least one conducting path for transmitting electrical signals. A conducting path can be produced in generally known manner on the substrate by spatial regions or areal regions of a presettable electrical conductivity. The conductivity can be produced by introducing a dopant or by depositing a structured layer of metal or alloy, for example. Optionally, several such layers can be produced on the substrate and can be separated from one another by insulating layers so as to also realize comprehensive networks for transmitting electrical signals.

At least one waveguide can be produced on the chip by etching and/or depositing a structured coating having a presettable refractive index. In other embodiments of the invention, the waveguide can be produced by processing a subarea or a partial volume by means of a laser beam. A plurality of waveguides can thus be written into the substrate by means of a laser beam. In some embodiments of the invention, a pulsed laser beam, in particular having a pulse length of 10 fs to 200 fs or 30 fs to 1000 fs, is suitable for this purpose.

The optical coupler, the filter element and the photoelectric converter as well as the optional electronic circuit and the optional light source can be functionally connected to one another by integrating waveguides and connecting paths on the substrate, and therefore the entire signal generation and signal readout are integrated on a chip.

In some embodiments of the invention, the apparatus is arranged on a single substrate. Such a monolithic design can be made on a silicon substrate, for example, since the latter permits in a simple way the integration of electronic circuits and waveguides as well as further optical components. This renders the production of the apparatus particularly simple.

In other embodiments of the invention, the apparatus can contain at least two substrates which are connected to one another by wafer bonding and/or adhering and/or soldering. This permits a preferred selection of materials for the individual components so as to increase the efficiency of the individual components and thus the efficiency of the entire apparatus. For example, the optical components can be integrated on a substrate made of silicon, quartz, sapphire or glass. An electronic circuit can be integrated on a second substrate made of silicon and/or a light source on a substrate made of gallium arsenide, a II-VI semiconductor or a III-semiconductor. These individual substrates are then combined into one substrate so as to obtain the compact design according to the invention again.

In some embodiments of the invention, the substrate can have at least one coating that is produced at least as a partial coating and contains or consists of sapphire and/or silicon oxide and/or barium titanate and/or a III-V semiconductor and/or a II-VI semiconductor and/or silicon. As a result of such a coating, it is for example possible to realize an electronic circuit or an optoelectronic semiconductor device on a substrate made of glass or quartz. In other embodiments of the invention, a waveguide made of barium titanate or an optoelectronic semiconductor device having a direct band gap can be made on a substrate of quartz or silicon. A plurality of electric conducting paths can be arranged on top of one another when they are separated from one another by means of an insulating coating. Finally, a waveguide can be made as a stripline when a corresponding coating is structured by subsequent exposure and etching. The embodiment having at least one substrate coating made as a partial coating thus permits a greater flexibility in the production of the apparatus according to the invention.

In some embodiments of the invention, the apparatus can be used to determine the floor loading in a building. For this purpose, a fiber-optic sensor can be integrated with a plurality of fiber Bragg gratings in a floor covering, e.g. a carpet or a plastic covering. A user's or inhabitant's movement profile can be made in the building by evaluating the spatial and/or temporal loading of the floor cover, e.g. for uses in the alarm and security technology. In other embodiments of the invention, the floor loading can be monitored so as to prevent excessive loading of a ceiling, e.g. in a storage room. In yet another embodiment, a person's fall can be detected on account of the loading scheme so as to give this person quick medical assistance. These applications are only enabled by the integrated apparatus according to the invention since an individual integrated chip according to the invention enables monitoring of many measuring points and thus a high spatial resolution over a large area.

BRIEF DESCRIPTION OF THE DRAWINGS

The invention is to be explained in more detail below by means of figures without limiting the general inventive concept, wherein.

DESCRIPTION OF PREFERRED EMBODIMENTS

Figure 1:
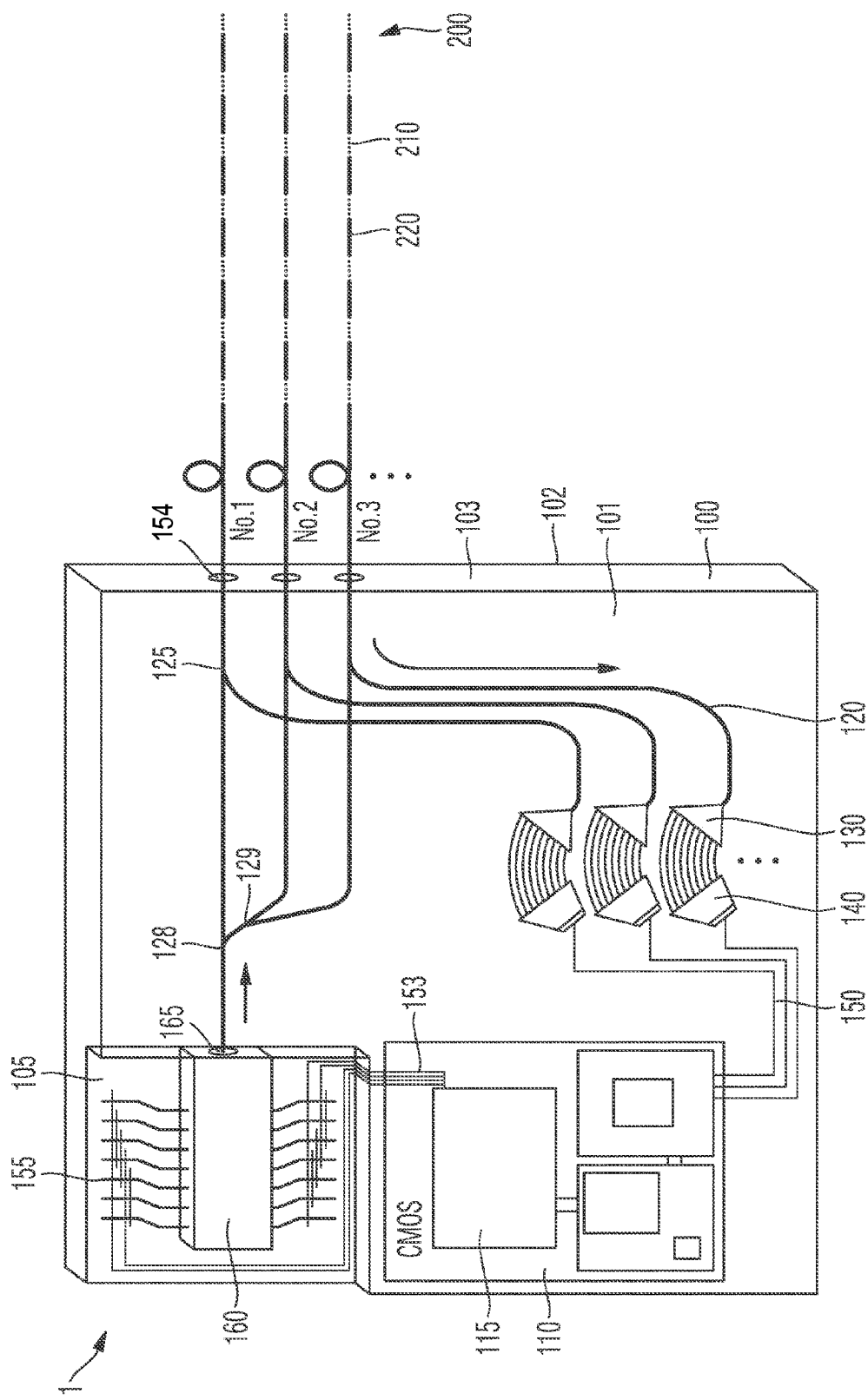
FIG. 1 shows a top view of a first embodiment of an apparatus according to the invention.

FIG. 1 shows an apparatus 1 for measuring state variables having at least one fiber-optic sensor 200. The fiber-optic sensor 200 contains an optical waveguide 220. The optical waveguide 220, in turn, contains a core and a jacket surrounding the core. Core and jacket here have different refractive indices, and therefore there is total reflection of the optical signal running in the core at the boundary between core and jacket. Depending on the diameter of the core, one or more modes can spread in the optical fiber. In some embodiments of the invention, the core can change into the jacket in graded fashion, thus resulting in different optical path lengths for different wavelengths.

At least one fiber Bragg grating 210 is arranged in the core of the optical waveguide. The fiber Bragg grating 210 can be written into the core of the optical waveguide by pulsed laser radiation, for example. In some embodiments of the invention, the pulsed laser radiation has a pulse length of 10 fs to 1000 fs for this purpose. The fiber Bragg grating 210 contains a plurality of areas extending approximately transversely to the longitudinal extension of the optical waveguide 200, the refractive index of which differs from the refractive index of the surrounding material of the core as a result of the influence of the laser radiation. The distance of these modified areas determines the grating constant of the fiber Bragg grating 210. Depending on the grating constant, the fiber Bragg grating 210 reflects a presettable wavelength or a wavelength range of incident optical radiation.

Should the optical waveguide 220 be exposed to a mechanical stress or a temperature fluctuation, the grating constant of the at least one fiber Bragg grating 210 is changed. As a result, another wavelength or another wavelength range is reflected by the fiber Bragg grating 210. This shift of the wavelength of the output signal is a measure for the acting force and/or the acting temperature. In some embodiments of the invention, a plurality of fiber Bragg gratings 210 can have an identical grating constant. In other embodiments of the invention, all fiber Bragg gratings 210 have different grating constants so as to enable a spatial resolution of the fiber-optic sensor 200.

In order to obtain measured values by means of the fiber-optic sensor 200, an optical input signal must be coupled into the latter and the signals reflected by the fiber Bragg grating 210 must be detected. Apparatus 1 serves this purpose and combines all components necessary for signal generation and evaluation on a substrate 100 in the exemplary embodiment as shown. As a result, the measurement signals can be produced reliably and in a compact module.

Substrate 100 has a first side 101 and an opposite second side 102. In the exemplary embodiment as shown, only the first side 101 is structured to produce the components required for signal generation and signal readout. However, the substrate 100 can, of course, also be processed on both sides.

In some embodiments of the invention, the substrate 100 can contain or consist of quartz, silicon, sapphire, glass or gallium arsenide. The substrate 100 can contain a dopant to produce a presettable electrical conductivity or a presettable refractive index. In addition, the substrate 100 can contain unavoidable contaminations which, during the production or the further processing of the substrate 100, are applied thereto or on the surface thereof.

In the exemplary embodiment as shown, the substrate has a recess 105 which can be introduced into the first side 101 of the substrate 100 by wet chemical or dry chemical etching, for example. However, the recess 105 is optional and can also be omitted in other embodiments of the invention. The recess 105 accommodates a light source 160, e.g. a superluminescent diode or a semiconductor laser. In some embodiments of the invention, the light source 160 can be adapted to produce a radiation having a wavelength between 800 nm and 1500 nm. In other embodiments of the invention, the wavelength can be between 1300 nm and 1600 nm. The light source 160 can emit a pulsed radiation or be used in continuous wave operation. The light source 160 is a transducer of electrical energy into optical power. Therefore, the light source 160 has at least one terminal contact 155 by means of which the light source 160 is supplied with electric energy and/or control signals. In the exemplary embodiment as shown, the light source 160 is made of a material differing from that of the substrate 100, e.g. a II-VI semiconductor, a III-V semiconductor or gallium arsenide. The light source 160 can be mounted on the substrate 100 by soldering, adhering or flip-chip bonding.

The light source 160 has an outlet opening 165, through which the optical radiation escapes. The luminous radiation is coupled into a waveguide 120 and reaches an optional optical coupler 128. The latter splits the optical power of an input signal into two output signals. In the exemplary embodiment as shown, a second optical coupler 129 is arranged behind the first optical coupler 128. Thus, the light of the light source 160 is divided into three output waveguides to which three fiber-optic sensors 200 are connected. In other embodiments of the invention, the number of fiber-optic sensors 200 can be greater or smaller and can be between 1 and approximate 25. The invention does not teach the use of precisely three fiber-optic sensors 200 as a solution principle. In order to connect the fiber-optic sensors 200, output couplers 154 are available which are arranged on the front side 103 of the substrate 100.

The light reflected by the fiber Bragg gratings 210 reaches the apparatus 1 via the output couplers 154 again. The light reflected by the fiber-optic sensors 200 is supplied to at least one filter element 130 via a coupler 125. In the exemplary embodiment as shown, an independent filter element 130 is provided for each fiber-optic sensor 200. The filter element 130 comprises a passive optical component which enables a spectral analysis of the coupled-in light. In the exemplary embodiment as shown, this is at least one arrayed waveguide grating 130. The arrayed waveguide grating 130 pictures light of different wavelength from the waveguide 120 on different points at its output. It is thus possible to extrapolate from a point-dependent measurement of the light intensity to the wavelengths of the optical signals running in the waveguide 120. For the point-dependent measurement, one CCD line 140 each is available which enables a good spatial resolution and thus a good frequency resolution of the optical signals.

The CCD line serves as an electro-optical converter which converts the optical signal of the fiber-optic sensors 200 into an electrical signal. The electrical signal is supplied to an electronic circuit 115 via electrical conducting paths 150. The electronic circuit 115 can contain an amplifier, and impedance transformer, an A/D converter or further circuits to amplify, transmit, discriminate or store the electrical signals. Furthermore, the electronic circuit 115 can ensure an energy supply of the electrical and/or electro-optical components located on the substrate 100 or pass control signals on to the light source 160. For this purpose, the electronic circuit 115 can be connected to the light source 160 via optional conducting paths 153.

The electronic circuit 115 can be integrated in monolithic fashion on the substrate 100, in particular when the substrate 100 is a semiconducting substrate. In other embodiments of the invention, a coating made of a semiconductor material can be deposited on the substrate 100 and an electronic circuit is subsequently realized on this coating by structuring and etching. In yet another embodiment of the invention, the electronic circuit 115 can be realized on a second substrate 110 which is mounted on the substrate 100 by an SOI method, flip-chip bonding or another, generally known method.

The electrical conductor paths 150 and 152 can be realized by depositing a metallization on the substrate 100. The filter element 130, the couplers 128, 129 and 125 as well as the waveguides 120 can be realized on and/or in the substrate 100 by etching the substrate 100, by depositing and laterally structuring a coating or by material modification in the substrate 100 using a laser radiation. Thus, the apparatus 1 is arranged on a substrate 100 in operationally reliable and compact fashion, and therefore it is also possible to reliably readout a large number of fiber Bragg gratings 210, e.g. more than 100, more than 200 or more than 300 fiber Bragg gratings 210.

Figure 2:
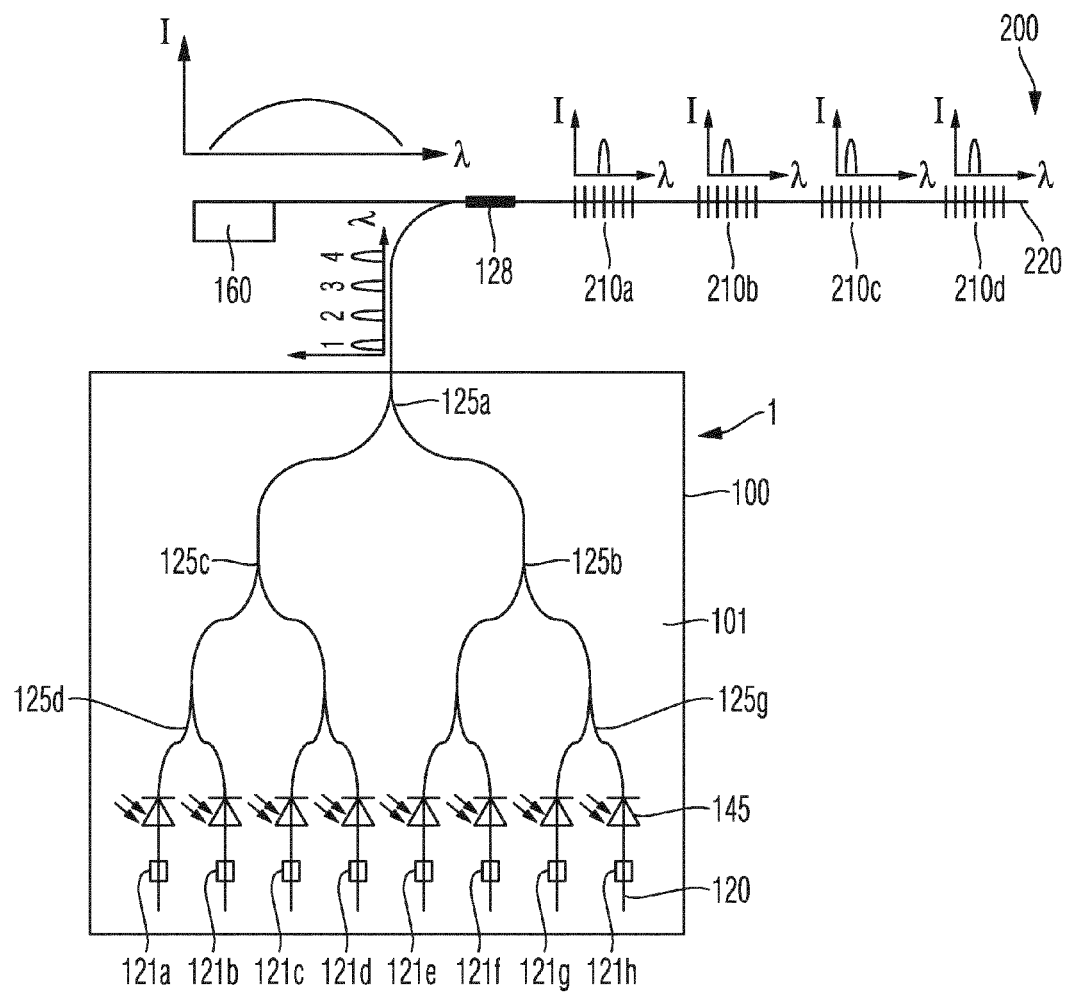
FIG. 2 shows a top view of a second embodiment of an apparatus according to the invention.

FIG. 2 shows a second embodiment of the apparatus 1 according to the invention. A fiber-optic sensor having four fiber Bragg gratings 210a, 210b, 210c and 210c is shown by way of example. Of course, the number of fiber-optic sensors 200 and the number of fiber Bragg gratings for each fiber-optic sensor 200 can also be greater or smaller. In the fiber-optic sensor 200, the light of a light source 160 is coupled in via a coupler 128, as described above by means of FIG. 1. The spectrum emitted by the light source 160 is shown in FIG. 2 by way of diagram. As evident from the figure, the intensity has a wide distribution over the wavelength.

Part of the spectrum is reflected at each of the fiber Bragg gratings 210a, 210b, 210c and 210d, wherein the width and/or the mean wavelength depends on the grating constant of the respective fiber Bragg grating 210 and/or on the mechanical stress and/or temperature acting on the fiber-optic sensor 200. The signal produced by the fiber-optic sensor 200 and supplied to the apparatus 1 via the coupler 128 is also shown in FIG. 2 by way of diagram. Compared to the irradiated spectrum, the received spectrum contains four relatively narrow wavelength ranges, each of which can be assigned to a fiber Bragg grating 210.

The received output signal of the sensor 200 is supplied to the apparatus 1 which is arranged on a substrate 100 having a first side 101 and an opposite, second side 102. The apparatus 1 contains seven couplers 125a, 125b, 125c, 125d, 125e, 125f and 125g. Each of the couplers splits the incoming optical power into two optical paths so as to finally yield eight paths. Two of these paths each are designed to evaluate the signal of a fiber Bragg grating 210. For this purpose, each optical path is equipped with a photoelectric converter 145, which, in the present exemplary embodiment, are photodiodes that can convert incident optical signals having a great bandwidth into electrical signals, and therefore rapid load changes or vibration states can also be detected by means of the fiber-optical sensor 200. Since all signals of all fiber Bragg gratings 210 are supplied to all paths via the couplers 125, each path contains a Bragg grating 121 to enable a wavelength-selective partial spectrum evidence in each of the photodiodes 145. The functioning can best be understood by means of the cross-section of FIG. 3.

Figure 3:
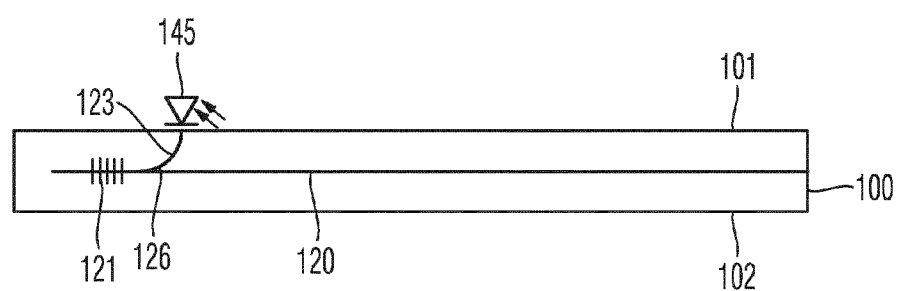
FIG. 3 shows a cross-section through the apparatus according to FIG. 2.

FIG. 3 shows a cross-section through the substrate 100. The waveguide 120 runs through the interior of substrate 100. A Bragg grating 121 which reflects light of a presettable wavelength is disposed at the end of the waveguide 120. In some embodiments of the invention, the Bragg grating 121 can have a spatially variable grating constant, and therefore the former reflects a wider wavelength range. The wavelengths which are not reflected by the Bragg grating 121 leave the waveguide 120 through the end thereof and are absorbed into the substrate 100.

The portion reflected by the Bragg grating 121 reaches the coupler 126 and then the active area of the photodiode 145 via the waveguide 123. In the exemplary embodiment as shown, each of the Bragg gratings 121a, 121b, 121c, 121d, 121e, 121f, 121g and 121h has a different grating constant, and therefore a different part of the spectrum can be identified in each photodiode.

The photodiodes are arranged on the surface 101 of substrate 100, whereas the waveguide and the Bragg grating 121 acting as filter element extend in the substrate interior.

Figure 4:
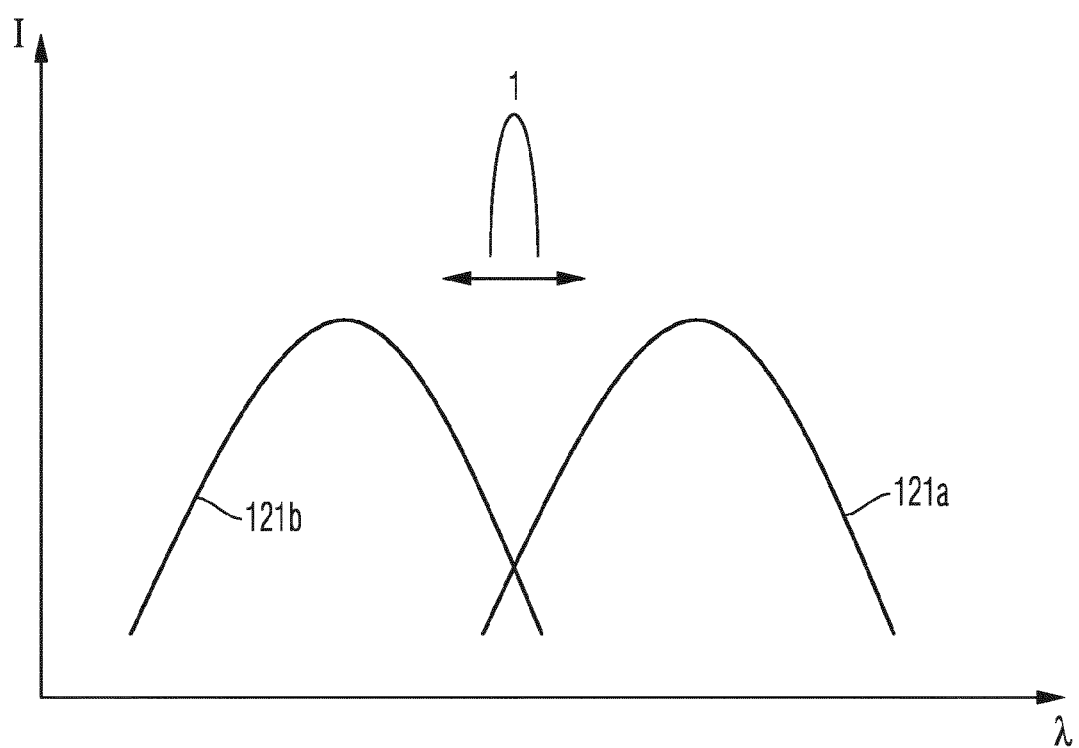
FIG. 4 explains the functioning of the apparatus according to FIG. 2.
Figure 5:
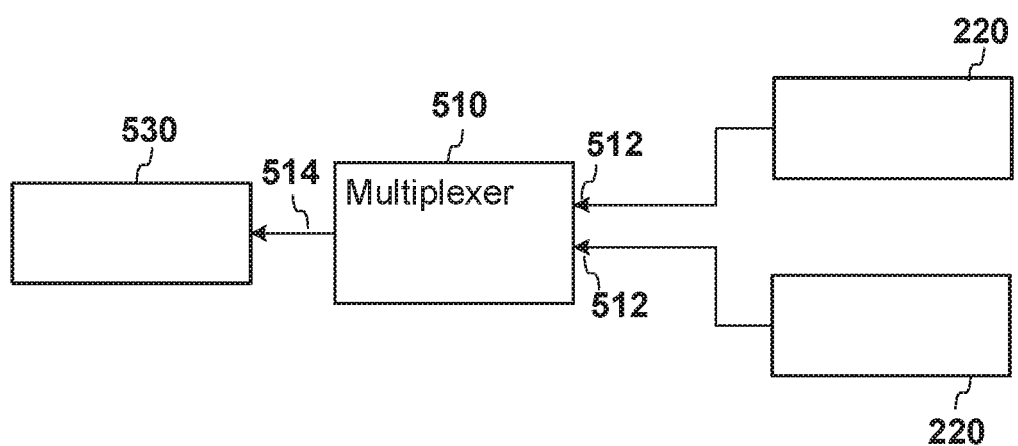
FIG. 5 shows a multiplexer.

The evaluation of the signals is shown in FIG. 4 by way of diagram. The reflected intensity and/or the irradiated intensity are shown by means of the wavelength. The reflection spectra of two Bragg gratings 121a and 121b are plotted, which are used as filter elements. As evident from FIG. 4, the reflection spectrum is comparatively wide since the Bragg gratings 121 have a spatially variable grating constant. FIG. 4 also shows that two adjacent Bragg gratings 121a and 121b show a different reflection spectrum.

FIG. 4 also shows the light spectrum 1 reflected by a fiber Bragg grating, e.g. the fiber Bragg grating 210a. A change in the grating constant of the fiber Bragg grating 210a will lead to a shift of the center frequency of the reflected spectrum 1, as shown by the arrow by way of diagram. This results in an increased reflection at the Bragg grating 121a and a reduced reflection at the Bragg grating 121b or vice versa. Thus, the signals in two adjacent photodiodes 145 show a complementary pattern, and therefore the electrical signals can be made plausible. In some embodiments of the invention, the grating constants of the Bragg gratings 121a and 121b are chosen in such a way that the reflected spectrum 1 remains in the approximately linear range of the reflection spectrum. This facilitates the evaluation of the electrical signals.

The invention is, of course, not limited to the embodiments shown in the figures. Therefore, the above description should not be regarded as limiting but as explanatory. The following claims should be understood in such a way that a feature mentioned is present in at least one embodiment of the invention. This does not rule out the presence of further features.

The invention claimed is:

1. Apparatus for measuring mechanical measurands with at least one fiber-optic sensor, said apparatus comprising:
   at least one optical coupler including a single optical coupler having a first, second and third connector;
   at least one fiber Bragg grating being configured as a filter element; and
   at least one photoelectric converter,
   wherein the single optical coupler, the filter element and the photoelectric converter are integrated on at least one substrate, the at least one substrate including a substrate that includes the single optical coupler, the substrate having two opposing sides that are larder than all other sides of the substrate,
   wherein the first connector of the single optical coupler is adapted to receive light from a fiber-optic sensor, wherein the light received from the fiber-optic sensor at the first connector of the single optical coupler is supplied to the second connector of the single optical coupler via the first connector,
   the second connector of the single optical coupler is coupled to the Bragg grating adapted to reflect at least a portion of the light received by the Bragg grating from the fiber-optic sensor via the first and second connectors of the single optical coupler, and
   the third connector of the single optical coupler is coupled to the photoelectric converter, wherein at least a portion of the light reflected from the Bragg grating is supplied to said photoelectric converter via the second and third connectors of the single optical coupler, wherein the first and second connectors of the single optical coupler are in a plane that is parallel to either of the two opposing sides of the substrate, and wherein the third connector of the single optical coupler extends perpendicularly to the plane that is parallel to either of the two opposing sides of the substrate.

2. Apparatus according to claim 1, characterized in that the substrate comprises or consists of quartz and/or silicon and/or sapphire and/or glass and/or GaAs.

3. Apparatus according to claim 1, further comprising at least one electronic circuit being integrated on the substrate.

4. Apparatus according to claim 1, further comprising at least one light source which is integrated on the substrate.

5. Apparatus according to claim 1, wherein the Bragg grating has a spatially variable grating constant.

6. Apparatus according to claim 1, further comprising at least one multiplexer having at least two inputs and at least one output, wherein the output is connected to the at least one filter element and the inputs are each connectable to one optical waveguide.

7. Apparatus according to claim 1, wherein the photoelectric converter comprises at least one photodiode and/or at least one COD line.

8. Apparatus according to claim 1, further comprising at least one waveguide for transmitting optical signals and/or at least one conducting path for transmitting electrical signals.

9. Apparatus according to claim 1, the at least one substrate comprising at least two substrates which are connected to one another by wafer bonding and/or by adhering and/or by soldering.

10. Apparatus according to claim 1, the at least one substrate comprising exactly one substrate.

11. Apparatus according to claim 1, wherein the substrate has at least one coating comprising sapphire and/or $SiO_2$ and/or $BaTIQ_3$ and/or a 111-V semiconductor and/or a IJ-VI semiconductor and/or Si.

12. Apparatus according to claim 1, wherein the filter element further comprises at least one waveguide which extends in the interior of the substrate and at the end of which the Bragg grating is arranged.

13. Apparatus according to claim 1, wherein the filter element comprises at least two Bragg gratings which show a different reflection spectrum.

14. Method for producing an integrated optical component, which comprises the following steps:
   providing a substrate;
   producing at least one optical coupler including a single optical coupler in the substrate, the single optical coupler having a first connector, a second connector, and a third connector, at least one filter element having a Bragg grating, and at least one photoelectric converter, such that
   the first connector of the single optical coupler is adapted to receive light from a fiber-optic sensor, the second connector of the single optical coupler is coupled to the Bragg grating being adapted to reflect at least a portion of the light and the third connector of the single optical coupler is coupled to the photoelectric converter, wherein said coupler is configured to guide at least a portion of the reflected light to said photoelectric converter, wherein the first and second connectors of the single optical coupler are oriented within a plane that is parallel to a front or a back of the substrate, and wherein the third connector of the single optical coupler curves away from the plane that is parallel to the front or the back of the substrate and extends to the front or the back of the substrate; and pulsing laser radiation having a pulse length of about 10 fs to about 1000 fs on the substrate.

15. Method according to claim 14, wherein in at least one step at least one layer is deposited and lithographically structured, which comprises or consists of sapphire and/or SiO2 and/or BaTiO3 and/or a 111-V semiconductor and/or a II-VI semiconductor and/or Si and/or a metal.

16. Method according to claim 14, wherein two substrates are connected to each other by wafer bonding and/or soldering and/or adhering.

17. Apparatus comprising:
at least one optical coupler including a single optical coupler having a first connector, a second connector, and a third connector, and
a filter element, and
a photoelectric converter,
wherein the optical coupler, the filter element and the photoelectric converter are integrated on a substrate,
wherein the single optical coupler is configured to receive light from a fiber-optic sensor at the first connector of the single optical coupler and to supply the light received from the fiber-optic sensor via the first connector to the filter element via the second connector of the single optical coupler,
wherein the filter element comprises a Bragg grating adapted to reflect a portion of the light received from the fiber-optic sensor via the first and second connectors of the single optical coupler,
wherein the single optical coupler is configured to receive the portion of the light reflected from the Bragg grating at the second connector of the single optical coupler, and the single optical coupler is configured to supply the portion of the light reflected from the Bragg grating to the photoelectric converter via the third connector of the single optical coupler, wherein the first and second connectors of the single optical coupler are arranged in a plane that is parallel to a surface of the substrate, and wherein the third connector of the single optical coupler curves away from the plane and extends to the surface of the substrate.

18. Apparatus according to claim 17, wherein the substrate comprises or consists of quartz and/or silicon and/or sapphire and/or glass and/or GaAs.

19. Apparatus according to claim 17, further comprising at least one electronic circuit being integrated on the substrate.

20. Apparatus according to claim 17, further comprising at least one light source which is integrated on the substrate.

21. Apparatus according to claim 20, wherein the light source comprises any of a semiconductor laser or a superluminescent diode.

22. Apparatus according to claim 17, wherein the Bragg grating has a spatially variable grating constant.

23. Apparatus according to claim 17, wherein the substrate has at least one coating comprising sapphire and/or $SiO_2$ and/or $BaTiO_3$ and/or a III-V semiconductor and/or a II-VI semiconductor and/or Si.

24. Apparatus according to claim 17, furthermore comprising a multiplexer having at least two inputs and an output, wherein the output is connected to the filter element and the inputs are each connected to a corresponding optical waveguide.

25. Apparatus according to claim 17, wherein the photoelectric converter comprises at least one photodiode and/or at least one CCD line.

26. Apparatus according to claim 17, further comprising at least one waveguide for transmitting optical signals and/or at least one conducting path for transmitting electrical signals.

27. Apparatus according to claim 17, wherein the filter element furthermore comprises at least one waveguide which extends in an interior of the substrate and at an end of which the Bragg grating is arranged.

28. Apparatus according to claim 17, wherein the filter element comprises at least two Bragg gratings which show a different reflection spectrum.

* * * * *

UNITED STATES PATENT AND TRADEMARK OFFICE
CERTIFICATE OF CORRECTION

| | |
|---|---|
| PATENT NO. | : 9,702,738 B2 |
| APPLICATION NO. | : 14/114085 |
| DATED | : July 11, 2017 |
| INVENTOR(S) | : Wolfgang Schade |

It is certified that error appears in the above-identified patent and that said Letters Patent is hereby corrected as shown below:

In the Claims

Column 9, Line 49, change "larder" to "larger"

Signed and Sealed this
Fourth Day of September, 2018

Andrei Iancu
*Director of the United States Patent and Trademark Office*